Patented Feb. 26, 1924.

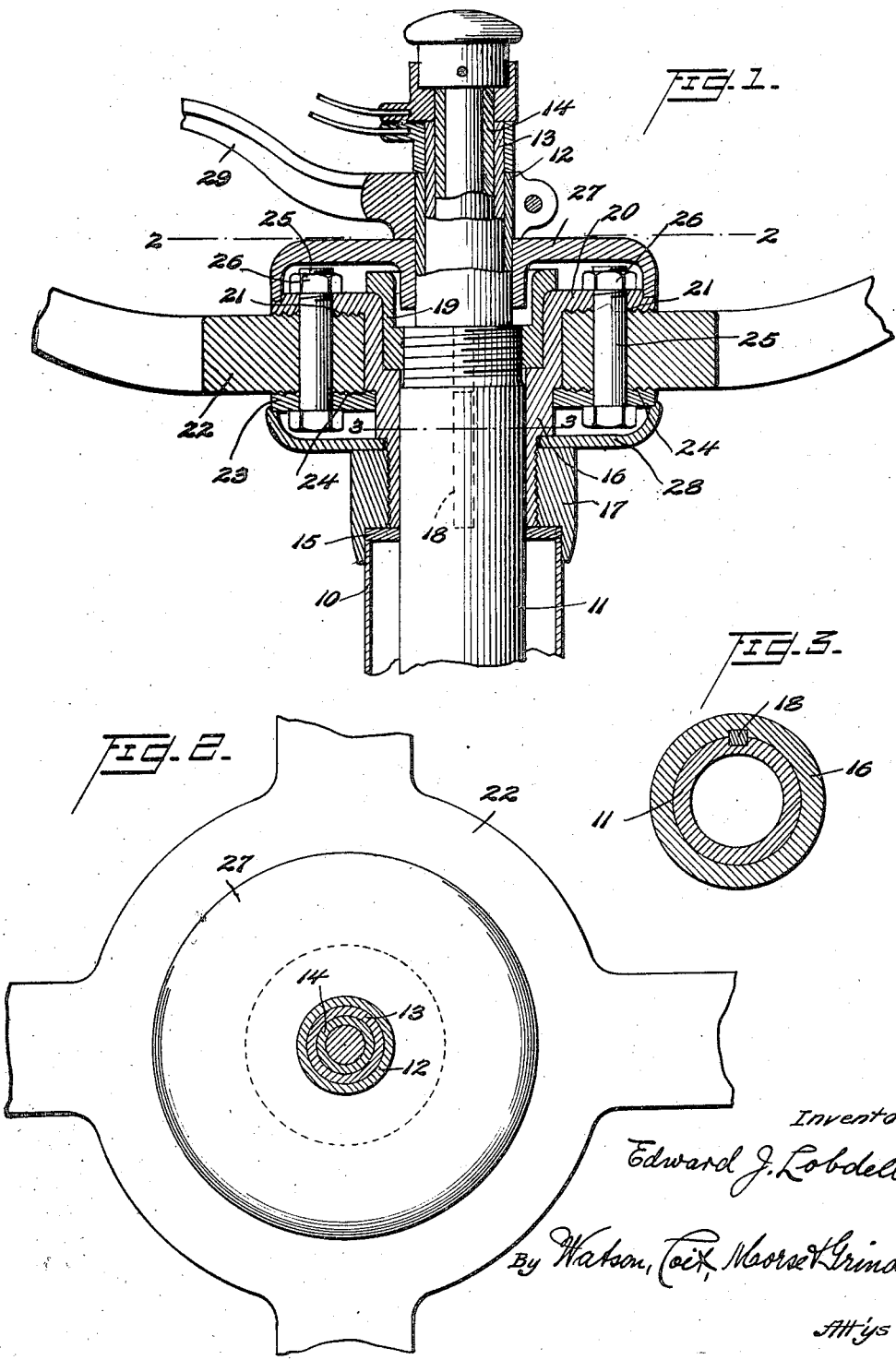

1,484,893

UNITED STATES PATENT OFFICE.

EDWARD J. LOBDELL, OF ONAWAY, MICHIGAN, ASSIGNOR TO THE AMERICAN WOOD RIM COMPANY, OF ONAWAY, MICHIGAN, A CORPORATION OF WEST VIRGINIA.

STEERING-WHEEL-ATTACHING DEVICE.

Application filed February 12, 1921. Serial No. 444,478.

*To all whom it may concern:*

Be it known that I, EDWARD J. LOBDELL, a citizen of the United States, and residing at Onaway, in the county of Presque Isle and State of Michigan, have invented certain new and useful Improvements in Steering-Wheel-Attaching Devices, of which the following is a specification.

The present invention relates to devices for securing steering wheels to the steering rods of automobiles, motor boats, airplanes, etc., and particularly to means for securing steering wheels having wooden hub portions to metallic steering rods. In the application for Letters Patent filed in the name of Charles H. Kendrick on October 16, 1920, Serial No. 417,459, a device is illustrated, described and claimed by means of which the wooden hub of a steering wheel may be rigidly secured to a metallic steering rod and the present invention is an improvement upon the invention disclosed in the application above mentioned.

One object of this invention is to provide a hub clamping device by means of which the hub will be more securely fastened to the steering post and may be securely held against rotation relatively to the post, which device is simple, strong and easily manufactured and assembled. Another object of the invention is to provide a casing for the securing device whereby the latter is entirely protected from the action of the elements and is also completely hidden from view so that the casing alone is visible, which presents a neat and attractive outline to the eye. Other objects will be apparent as the invention is disclosed in the following description when taken with the accompanying drawings, in which:—

Figure 1 is a longitudinal sectional view through the upper end of an automobile steering column having the improved wheel attaching device secured thereto;

Figure 2 is a section on the line 2—2 of Figure 1; and

Figure 3 is a section on line 3—3 of Figure 1.

The outer casing of the steering column is indicated at 10, the tubular steering rod at 11, the tubular stationary member at 12 and the usual throttle and spark controlling rods at 13 and 14 respectively. The casing 10 terminates considerably below the end of the steering rod 11 and has upon its upper end an annular washer 15 which supports the lower end of a sleeve member 16 preferably of cast aluminum, and also supports the lower end of a nut 17 which is threaded upon the lower end of the sleeve. The sleeve 16 rotates with the rod 11, being keyed thereto by a key 18, and this sleeve is formed at its upper end with a central recess to receive a nut 19 having threaded engagement with the steering rod and which is designed to cooperate with the washer 15 in preventing the sleeve from moving longitudinally. The sleeve is also formed with an exterior annular flange 20 at its upper end which flange has a series of concentric circular corrugations or grooves 21 on its lower surface. The wood or fiber hub 22 of a steering wheel is clamped between the flange 20 and an annular member 23, the upper surface of which is also provided with a series of concentric circular grooves or knife edges 24. A plurality of bolts 25 are provided whereby the annular disk may be drawn toward the flange 20 in clamping the hub, and to maintain it in clamping position. The rotatable nuts 26 are located at the upper ends of the bolts so that they may be reached from above in making adjustments.

In order that the hub clamping device be entirely protected from the elements and also in order to provide a construction having an ornamental appearance, a two-part casing is provided comprising an annular dome-shaped member 27 above the hub and securing device, and a substantially similar member 28 below the hub, the concave surfaces of these members being directed toward the hub so that they form housings for the ends of the bolts 25. The upper portion 27 of the casing is held in position by the stationary sector 29 which is secured to the stationary rod 12 and the lower portion of the casing is clamped between a shoulder on the sleeve 16 and the upper end of the nut 17. The sector 29 as well as the gas and spark levers are of course not placed in position until after the wheel has been secured to the steering rod and the upper member 27 of the casing placed in position.

Numerous changes may be made in the exact form and arrangements of the elements of the invention which is therefore not limited in its scope to the exact form described and illustrated.

Having thus described the invention what is claimed as new and desired to be secured by Letters Patent is:

1. The combination with a steering wheel having a wooden hub portion, of means for securing the same to a steering rod comprising a sleeve adapted to fit over the steering rod and to be fastened thereto and having an exterior annular flange lying on one side of the wooden hub, an annular ring member concentric with the sleeve and lying on the opposite side of the wooden hub, and a plurality of bolts extending through said ring and annular flange for moving the ring to clamp the hub between the ring and flange and to hold the hub clamped in such position, said flange and ring having their facing surfaces deeply grooved in a direction substantially perpendicular to the length of a spoke of the wheel.

2. The combination with a steering wheel having a wooden hub portion, of a steering column having a casing and a steering rod protruding beyond the end of the casing, of means for securing the steering wheel to the projecting portions of the steering rod comprising, a sleeve adapted to fit over the steering rod and to be secured thereto, the lower end of said sleeve being supported on said casing and said sleeve having an exterior annular flange lying on one side of the wooden hub, an annular ring member concentric with the sleeve and lying on the opposite side of the wooden hub, a nut having threaded engagement with the steering rod and bearing on the sleeve to clamp the same between said nut and casing, and means for moving the ring toward the annular flange to clamp the hub and to hold the same clamped in such position.

3. The combination with a steering wheel having a wooden hub portion, of means for securing the same to a steering rod comprising a sleeve adapted to fit over the steering rod and to be fastened thereto and having an exterior annular flange lying on one side of the wooden hub, an annular ring member concentric with the sleeve and lying on the opposite side of the wooden hub, and a plurality of bolts extending through said ring and annular flange for moving the ring to clamp the hub between the ring and flange and to hold the hub clamped in such position, the surfaces of said flange and ring in contact with said wooden hub having corrugations concentric with said sleeve.

4. The combination with a steering wheel having a wooden hub portion, of means for securing the same to a steering rod including a sleeve adapted to fit over the steering rod and to be fastened thereto, means for securing the hub to said sleeve, and a casing enclosing said securing means.

5. The combination with a steering wheel having a wooden hub portion, of means for securing the same to a steering rod including a sleeve adapted to fit over the steering rod and to be fastened thereto, means for securing the hub to said sleeve, and a casing enclosing said securing means, said casing being formed in two portions, one portion being below the hub and the other portion being above the hub.

6. The combination with a steering wheel having a wooden hub portion, of means for securing the same to a steering rod including a sleeve adapted to fit over the steering rod and to be fastened thereto, means for securing the hub to said sleeve, and a casing enclosing said securing means, said casing being formed in two annular portions concentric with the steering rod, one portion being below and the other portion being above the hub and hub securing means.

7. The combination with a steering wheel having a wooden hub portion, of means for securing the same to a steering rod including a sleeve adapted to fit over the steering rod and to be fastened thereto, means for securing the hub to said sleeve, and a casing enclosing said securing means, said casing being formed in two annular dome-shaped portions concentric with the steering rod, one portion being below the hub securing means and having its concave side upwardly directed, and the other portion being above the hub securing means and having its concave side downwardly directed.

8. The combination with a steering wheel having a wooden hub portion, of means for securing the same to a steering rod including a sleeve adapted to fit over the steering rod and to be fastened thereto, means for securing the hub to said sleeve, a casing enclosing said securing means, said casing being formed in two portions, one portion being below the hub and the other being above the hub, and means for holding the two portions of the hub in fixed spaced relation.

In testimony whereof I affix my signature.

EDWARD J. LOBDELL.